United States Patent [19]

Dassonville

[11] 4,370,607
[45] Jan. 25, 1983

[54] STATIC HIGH VOLTAGE SWITCH USABLE IN A SWITCHABLE HIGH VOLTAGE D.C. GENERATOR

[75] Inventor: Jacques Dassonville, Paris, France

[73] Assignee: Thomson-CSF, Paris, France

[21] Appl. No.: 257,131

[22] Filed: Apr. 24, 1981

[30] Foreign Application Priority Data

Apr. 29, 1980 [FR] France ............................. 80 09619

[51] Int. Cl.³ .......................................... H03K 17/74
[52] U.S. Cl. .................................. 323/271; 323/324; 363/68
[58] Field of Search ...................... 323/271, 239, 324; 363/68, 69, 126, 135

[56] References Cited

U.S. PATENT DOCUMENTS

| 3,350,623 | 10/1967 | Clapp | 363/68 |
| 3,386,027 | 5/1968 | Kilgore et al. | 363/68 |
| 3,579,082 | 5/1971 | Bossi et al. | 363/69 |
| 3,889,175 | 6/1975 | Isogai et al. | 363/68 |
| 3,914,617 | 10/1975 | Corbel | 323/271 X |
| 4,027,169 | 5/1977 | Lowther | 363/135 X |

FOREIGN PATENT DOCUMENTS

| 2552408 | 5/1977 | Fed. Rep. of Germany | 363/68 |
| 1521349 | 3/1968 | France | |
| 2041951 | 2/1971 | France | |
| 2097302 | 3/1972 | France | |
| 2279250 | 2/1976 | France | |
| 539359 | 12/1976 | U.S.S.R. | 363/68 |

Primary Examiner—A. D. Pellinen
Attorney, Agent, or Firm—Cushman, Darby & Cushman

[57] ABSTRACT

A static high voltage switch which can be constructed in miniaturized form and having a high degree of reliability, it comprises a bridge of switches, such as thyristors, each controlled by a secondary winding of a transformer whose single primary winding is connected to the secondaries by toroidal cores. Each toroidal core comprises a secondary winding. The primary winding is constituted by a high voltage cable element, which passes axially through the cores.

7 Claims, 5 Drawing Figures

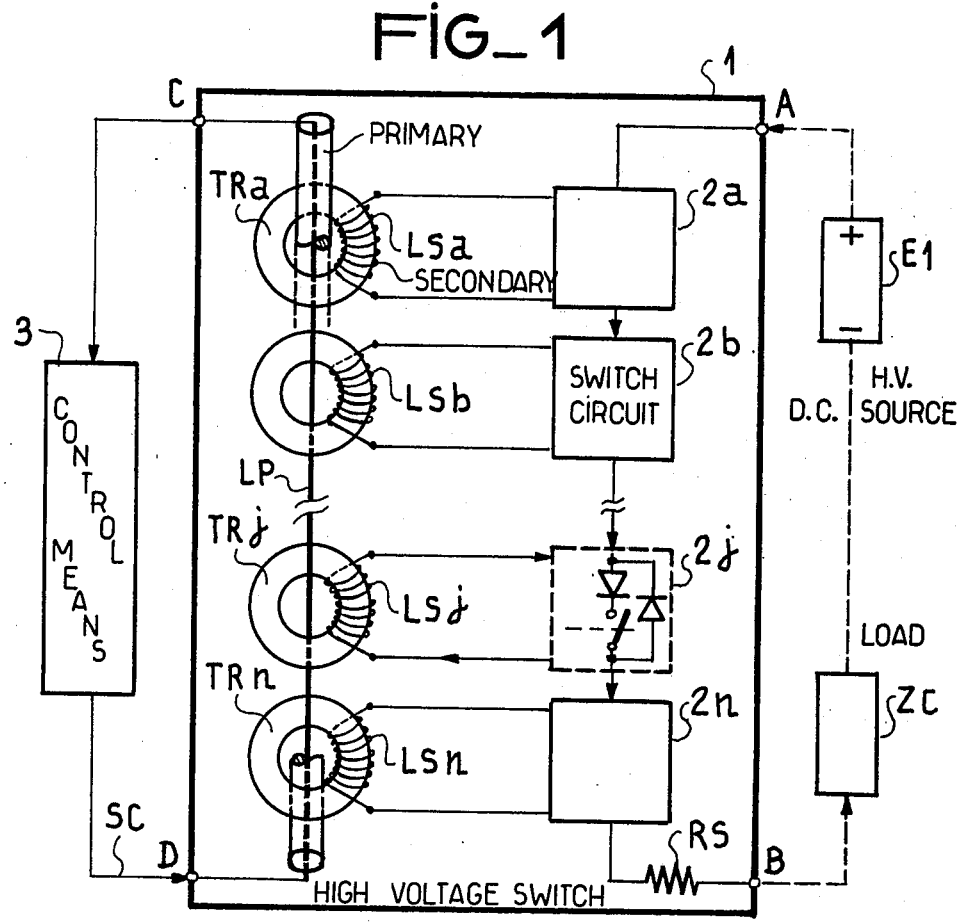
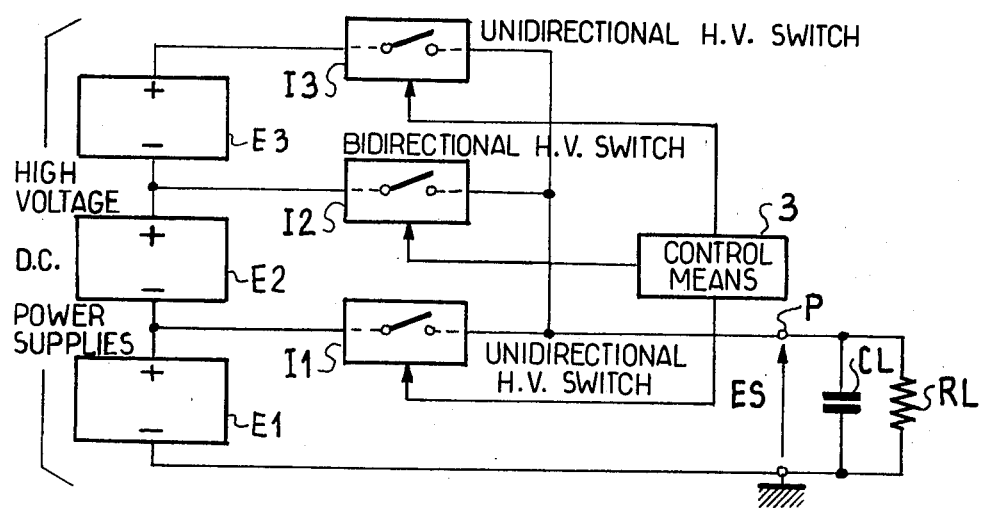

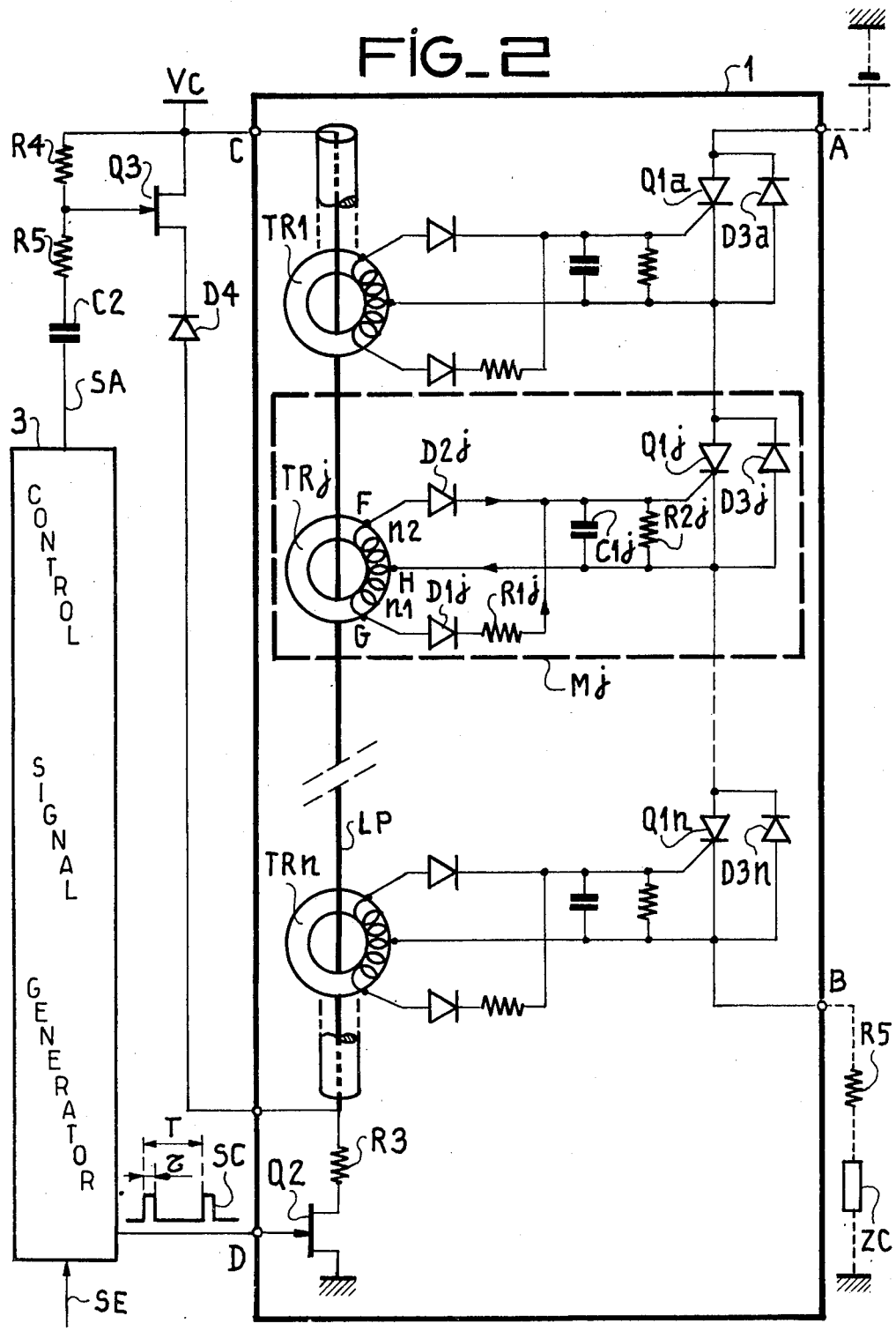

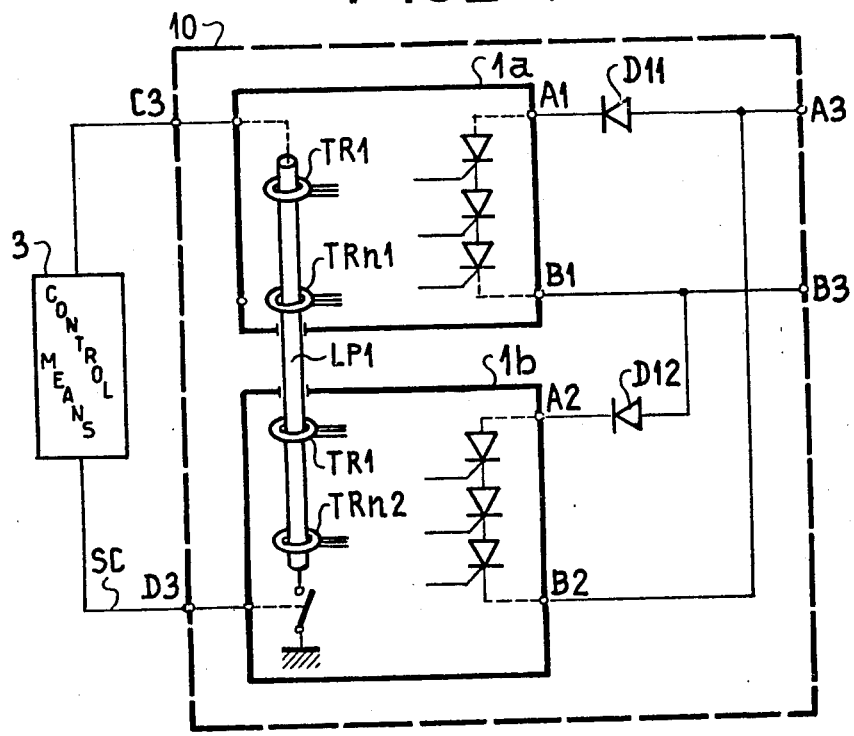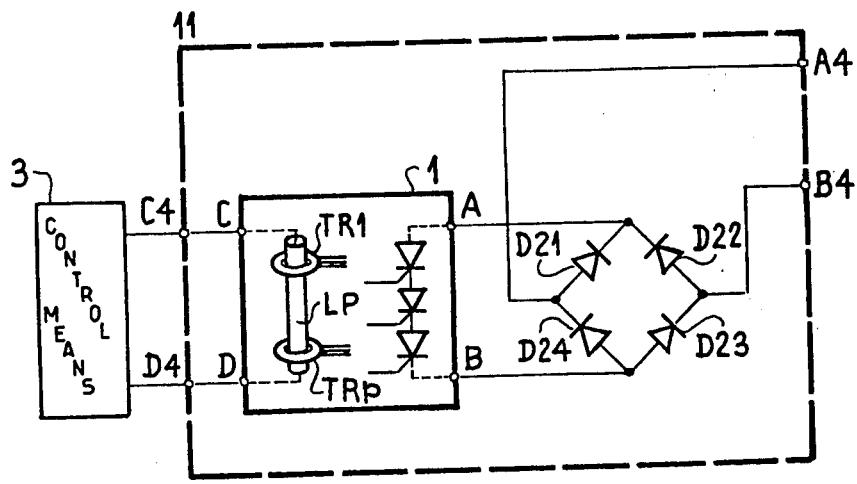

STATIC HIGH VOLTAGE SWITCH USABLE IN A SWITCHABLE HIGH VOLTAGE D.C. GENERATOR

BACKGROUND OF THE INVENTION

The present invention relates to improvements to static high voltage switches and is advantageously applicable to the construction of a switchable high voltage generator.

It is known to use a bridge of electrically controlled switches based on semiconductor elements for opening a high voltage discharging circuit or closing a charging circuit, thus varying by a discreet value the level of the high voltage for the load circuit. The bridge is often formed by a plurality of series-connected thyristors, each having an avalanche diode connected in parallel and in the opposite direction for protection against overloads. The number of switch components to be placed in series is a function of the maximum voltage permitted by the component and the high voltage to be switched, as well as the cost and complexity of the control circuits. The latter comprise a transformer with a primary winding coupled to the same number of secondary windings as there are switches to be controlled. A construction of this type is inter alia described in U.S. Pat. No. 3,914,617.

This procedure has numerous disadvantages. More particularly in the case of miniaturized constructions the winding can be supported by a ferrite core, but it is difficult to obtain an adequate insulation and good coupling, the distribution of the fluxes cannot be balanced for all the secondary windings and the service life remains relatively limited.

BRIEF SUMMARY OF THE INVENTION

The present invention relates to a miniaturized static high voltage switch having a high level of reliability and which obviates the aforementioned difficulties. It is able to support considerable insulation, which can well be several dozen kV, whilst it can easily be produced by using a single basic cell or module.

According to a feature of the invention a static high voltage switch is provided in which the coupling between the primary winding and the secondary windings is by means of toroidal cores stacked along a single insulated conductor which axially traverses the same and which forms the primary winding, each toroidal core supporting a secondary winding controlling a switch component of the bridge.

BRIEF DESCRIPTION OF THE DRAWINGS

The invention is described in greater detail hereinafter relative to non-limitative embodiments and with reference to the attached drawings, wherein:

FIG. 1 is a general diagram of a static high voltage switch according to the invention.

FIG. 2 is an embodiment of a switch according to FIG. 1.

FIG. 3 is a simplified diagram relating to an application to a switchable high voltage generator.

FIGS. 4 and 5 show two constructional variants of a switch according to the invention for permitting bidirectional operation.

DETAILED DESCRIPTION OF THE PREFERRED EMBODIMENTS

With reference to FIG. 1 the static high voltage switch is represented by block 1. A bridge of n thyristors or other equivalent semiconductor components connected in series is represented by the switch circuits $2a$ to $2h$. Each switch circuit $2j$ is controlled from a secondary winding LSj. The n secondary windings LSj to LSn are coupled to a single primary winding LP. Circuit 3 processes a control signal SC making it possible to pass a current into the primary winding and via the slope of the secondary windings to control the closing of switch circuits $2a$ to $2n$. The circuit is shown outside the actual switch 1, in view of the fact that it can be designed to control several static high voltage switches. Terminals A and B at the end of the bridge constitute the terminals for branching the switch into the working circuit between a high voltage D.C. source E1 and load impedence Zc. A resistor RS in series with the bridge is generally provided for limiting the maximum current in said branch for the switch components. Resistor RS can be located in switch 1, as in the case where the operating conditions are defined beforehand and consequently its value is known, or can be positioned outside in other cases, when its value is determined as a consequence. Switch circuits $2a$ to $2n$ are unidirectional as functionally symbolized in block $2$-$j$ and the current circulating in the bridge has the indicated direction.

In the present state of the art of low power semiconductors, a voltage response of approximately 1 kV is considered to be a maximum value. Under these conditions a bridge based on n switch components in series permits a switching operation not exceeding n kV. The semiconductors which can be used for this can be bipolar transistors, thyristors having a hold current higher than the maximum charging current Zc, field effect devices, etc.

According to the invention coupling between the primary winding and the secondary windings is produced by means of toroidal cores TRa to TRn. Each core supports a winding constituting a secondary winding LSj. The primary winding LP is constituted by an insulated conductor passing through all the cores substantially in the corresponding axial direction. The insulation of the conductor wire is such that it is able to withstand the operating voltage required for the switch 1. Thus, the circuit is formed by n transformers each with a single turn at the primary constituted substantially by the fraction of conductor LP traversing the corresponding toroidal core perpendicular to its plane. According to a preferred embodiment the toroidal cores are stacked and the primary LP is formed by a high voltage cable element arranged in accordance with the common axis of the cores.

FIG. 2 shows a possible embodiment of a static high voltage switch according to the invention. The system between terminals A and B is formed by a bridge of thyristors Q1$a$ to Q1$n$, each thyristor Q1$j$ being protected by an avalanche diode D3$j$, whose avalanche voltage is below the breakdown voltage of the thyristor. Each basic module comprises, in the manner shown for module M$j$ relating to core TR$j$, two diodes D1$j$ and D2$j$ respectively arranged on the connections passing from ends F and G of the secondary winding LS$j$ to the control electrode or gate of thyristor Q1$j$. The current passage direction in the cable through each toroidal core is such that the input of the primary winding Lp connected to point C is in phase with point G of the secondary winding. A resistor R1j is superimposed on the connection from G. The return connection between switch circuit Q1j–D3j corresponding to block 2j in FIG. 1 and the secondary winding LSj reaches an intermediate point H of the winding. The winding respectively comprises n1 and n2 turns between intermediate point H and ends G and F. A capacitor C1j and optionally a resistor R2j are connected in parallel between the gate connection and the return connection.

Control circuit 3 receives an external control signal SE for starting switch 1. Signal SE can be in binary form the value "1" corresponding to starting and the value "0" to stopping. On receiving signal SE of value "1" circuit 3 processes the signal SC formed by periodic pulses of duration $\tau$ and period T. Signal SC is applied to a switch circuit Q2, such as a field effect transistor, connected to one end of winding LP, whose other end C is connected to a fixed potential +Vc of an ancillary continuous low voltage supply, e.g. Vc= +15 V. Resistor R3 interposed in series with switch Q2 serves to limit the primary current.

Operation is as follows. Signal SE being equal to "1," signal SC is delivered and brings about the periodic closing of switch Q2 and the application on each occasion of voltage Vc to the terminals of primary LP during time $\tau$.

A first operating phase is produced during time $\tau$ of pulse SC and is called the forward operating phase. Voltage +Vc is supplied to all the n series transformers. The induced voltage $e_1$ on each secondary between H and G is close to $$\left( \frac{Vc - R3 \cdot Ip}{n} \right),$$

Ip being the primary current. This voltage $e_1$ produces a secondary current IS1 across D1j and R1j to the thyristor gate. The voltage induced between F and H does not give rise to a current, in view of the blocking by diode D2j. The initial value of current IS1 is limited due to resistor R1j to a given value ensuring the conduction of thyristor Q1j for an anode current which is even below its hold value, in such a way that it cannot be deenergized. The duration of this phase is a function of the maximum flux capacity of the toroidal core used. The secondary current decreases exponentially as a result of the saturation of the transformers, the primary current being finally stabilized to the value $I_{PM}$=Vc/R3.

A second operating phase is then produced during time T−$\tau$ separating two pulses SC and this is called the flyback operating phase. The energy stored in the toroidal core equal to $W=\frac{1}{2}L_R I^2_{PM}$, with $L_R$ being the residual inductance of the primary is restored in the secondary circuit between H and F giving rise to an initial current $I_{S2}=I_{PM}/n2$.

The energy ratio between the two operating phases must be optimized to obtain a sufficiently low current modulation to be absorbed by the buffer capacitor C1j. For a given toroidal core the variables to be considered to carry this out are as follows: the operating frequency, the cyclic ratio of the pulse signal SC, the ratio n1/n2 and the values of resistors R1j and R3. Under these conditions the gate current is permanently assured.

The stoppage of switch 1 results from the elimination of pulses SC as a result of the passage to "0" of signal SE. Blocking is accelerated by dissipating the energy stored as a result of a complementary circuit arrangement using a switch Q3 at the terminals of the primary and which, on becoming conductive, immediately eliminates any secondary current. During the stoppage control output SA controls the closing of the field effect transistor Q3. Resistor R2j discharges capacitor C1j, which was charged to the mean value between the gate and cathode of the thyristor. Resistor R2j can form part of switch component Q1j. The control of switch 1 set up in this way permits a very rapid response time of the order of 1 microsecond.

FIG. 3 shows an application to a switched high voltage generator, which serves to cyclically produce a continuous voltage ES which can be varied in stages. This type of generator is more particularly intended for supplying a cathode ray tube of the penetration type forming a load impedance constituted by a low capacitance CL and a high resistance RL in parallel. The generator comprises three static high voltage switches I3, I2 and I1, whose successive closure, with the two other switches being opened, makes it possible to produce: ES=E1+E2+E3, then E1+E2 and finally E1 during a cycle. The arrangement of the three high voltage D.C. sources E1, E2 and E3 in series facilitates their realization and is made possible by the use of static high voltage switches according to the invention. The insulation problem is transferred to the switches I1, I2 and I3, respectively connected between a positive output terminal of a high voltage block and the corresponding load terminal P. Switches I3 and I1 are unidirectional because I3 always switches a charging current and I1 always switches a discharging current. Diodes D3a to D3n of switch I1 ensure the passage of the permanent direct current from the corresponding block E1 to the low voltage stage. However, switch I2 must be bidirectional in order to switch a positive or negative current into the charge. The construction of switch I2 can involve two unidirectional switches connected in parallel and in head to tail manner or a single unidirectional switch installed in a diagonal of a bridge of four high voltage diodes.

Two corresponding constructional variants are illustrated in FIGS. 4 and 5.

According to FIG. 4 the bidirectional switch 10 results from a unidirectional arrangement in which the series of elementary switch circuits 2j is subdivided into two groups of n1 and n2 circuits respectively and the addition of two branching diodes D11 and D12 to the connections at the output terminals A3 and B3 of switch 10. Diode D11, with the indicated direction, permits the circulation of current in direction A3 to B3 when the elementary switch circuits are closed, whilst the current can circulate in direction B3 to A3 across D12. This corresponds to the head to tail arrangement of two unidirectional switches 1a and 1b respectively having n1 and n2 toroidal cores. Branching by diodes D11 and D12 makes it possible to use one of the switches, e.g. 1a in the presence of a charging current and the other switch e.g. 1b in the case of a discharging current.

The primaries are advantageously formed by the single cable LP1 for the two blocks 1a and 1b controlled by circuit 3. In an application according to FIG. 3 bidirectional switch 12 must block either voltage E2 or voltage E3 and switches I1 and I3 voltage E2+E3. Assuming that switches I1 and E3 comprise n toroidal cores, switch I2 also comprises n1+n2=n cores in all, the values n1 and n2 being determined with respect to the values E2 and E3, so that e.g. for E2=E3 we obtain n1=n2=n/2.

According to FIG. 5 the bidirectional switch 11 is formed by a switch 1, as described hereinbefore, arranged in a diagonal of a bridge with four high voltage diodes D21, D22, D23 and D24. The second diagonal of the bridge is connected to the connecting terminals A4 and B4 of the arrangement. The current still circulates from A to B in switch 1, when the latter is closed. In the context of the application of FIG. 3 for E2=E3 a number p=n/2 of toroidal cores is sufficient, i.e. half that of switches I1 and I3.

A modular construction can be obtained by an arrangement on a ceramic plate of the different semiconductor elements or solid components of module Mj and of core TRj provided with its winding LSj. The connections between the elements can be constructed by printed circuit technology or by deposition. The ceramic support is perforated to permit the passage of the insulated cable forming the primary LP. The modular structure facilitates manufacture, controls and standardization by grouping the necessary number of modules.

The insulation conditions of the static high voltage switch are transferred to the high voltage cable element from the primary LP, wo that the insulated cable diameter imposes the size of the toroidal cores and the modules.

In conclusion, the advantages provided by the described solution help to facilitate the construction of the high voltage switch, which can be constructed in miniaturized form, has a high degree of reliability and a high speed linked with the use of semiconductors.

What is claimed is:

1. A static high voltage switch for controllably coupling and decoupling a high voltage D.C. source to and from a load, comprising:
   a bridge of n series-connected, electrically controllable switch circuits, each switch circuit including at least one semiconductor switching element and having a current input, a current output and a control port including a control input and a contol return, the current output of a switch circuit being connected to the current input of the adjacent switch circuit of the bridge to form the series connection of switch circuits, the current input of the first switch circuit of the bridge and the current output of the last switch circuit of the bridge comprising terminal ends of the bridge for connection to the high voltage D.C. source and load, respectively;
   a plurality of n-toroidal cores, one core being associated with each of the switch circuits, each core being wound with a secondary winding including first and second ends and an intermediate tap;
   a plurality n of circuit means, one circuit means being associated with each toroidal core and its corresponding switch circuit for coupling the secondary winding of its associated toroidal core to the control port of its associated switch element, each circuit means including a first diode and series resistor coupling the first end of its associated secondary winding to the control input of its associated switch circuit, a second diode coupling the second end of the associated secondary winding to the control input, means for coupling the control return to the intermediate tap of the secondary, and a capacitor coupling the control input to the control return; and
   a primary winding formed by an insulated wire element passing through each of the n-toroidal cores for coupling to an external control signal source for controlling the static high voltage switch.

2. A switch according to claim 1, wherein
   (a) the toroidal cores are stacked so as to have a common axis,
   (b) the wire element forming the primary winding comprises a high voltage cable element, and
   (c) the switch is constructed in modules, each module including one of the toroidal cores with its secondary winding, its associated switch circuit and its associated circuit means coupling the secondary winding to the switch circuit.

3. A switch according to claim 1 or 2, wherein
   (a) the switch element comprises a thyristor having a gate forming the control input and an avalanch diode in parallel with the thyristor, and
   (b) the primary winding is coupled to a D.C. power source through a primary switch controlled by periodic pulses from the external control signal source.

4. A switch according to claim 1 or 2, further including primary winding circuit means comprising:
   a first primary switching element for coupling a first end of the primary winding to a D.C. power source, the switching element being adapted to receive a pulse signal from the control signal source; and
   means for coupling a second end of the primary winding to the D.C. power source.

5. A switch according to claim 4, wherein the primary winding circuit means further comprises
   a second primary switching element coupled in circuit with the primary winding and being adapted to receive a binary digital control signal from the control signal source for controlling the starting and stopping of the static high voltage switch.

6. A switch according to claim 1 or 2, further including an output diode bridge for coupling the terminal ends of the bridge of n series-connected switch circuits to the high voltage D.C. source and load, the terminal ends of the series connected switch circuits being coupled to a first diagonal of the output bridge, the second diagonal of the output bridge, being connected to the high voltage D.C. source and load whereby the high voltage static switch can be operated bidirectionally.

7. A static high voltage switch for controllably coupling and decoupling a high voltage D.C. source to and from a load, comprising:
   a first bridge of n1 series-connected electrically controllable switch circuits each switch circuit including at least one semiconductor switching element and having a current input, a current output and a control port including a control input and a control return, the current output of a switch circuit being connected to the current input of the adjacent switch circuit of the bridge to form the series connection of switch circuits, the current input of the first switch circuit of the bridge and the current output of the last switch circuit of the bridge comprising terminal ends of the bridge;
   a second bridge of n2 series connected electrically controllable switch circuits each switch circuit including at least one semiconductor switching element and having a current input, a current output and a control port including a control input and a control return, the current output of a switch circuit being connected to the current input of the adjacent switch circuit of the bridge to form the series connection of switch circuits, the current input of the first switch circuit of the bridge and the current output of the last switch circuit of the bridge comprising terminal ends of the bridge;

a first plurality of n1-toroidal cores, one core being associated with each of the switch circuits of said first bridge, each core being wound with a secondary winding including first and second ends and an intermediate tap;

a second plurality of n2-toroidal cores, one core being associated with each of the switch circuits of said second bridge, each core being wound with a secondary winding including first and second ends and an intermediate tap;

a first plurality n1 of circuit means, one circuit means being associated with each toroidal core of the first plurality n1 of toroidal cores and its corresponding switch element for coupling the secondary winding of its associated toroidal core to the control port of its associated switch element, each circuit means including a first diode and series resistor coupling the first end of a secondary to the control input of its associated switch circuit, a second diode coupling the second end of the secondary to the control input, means for coupling the control return to the intermediate tap of the secondary, and a capacitor coupling the control input to the return;

a second plurality n2 of circuit means, one circuit means being associated with each toroidal core of the second plurality n2, of toroidal cores and its corresponding switch element for coupling the secondary winding of its associated toroidal core to the control port of its associated switch element, each circuit means including a first diode and series resistor coupling the first end of a secondary to the control input of its associated switch circuit, a second diode coupling the second end of the secondary to the control input, means for coupling the control return to the intermediate tap of the secondary, and a capacitor coupling the control input to the return;

a primary winding formed by an insulated wire element passing through all of the n toroidal cores (n=n1+n2) for coupling to an external control signal source for controlling the static high voltage switch;

a pair of terminals for connection to the high voltage D.C. source and load, respectively; and first and second diode circuit means for coupling the terminals to the terminal ends of the first and second bridges, the diodes coupling the terminals to the two bridges being arranged in opposite polarity so that bidirectional operation of the static high voltage switch is made possible.

* * * * *